US012148586B2

(12) United States Patent
Hill et al.

(10) Patent No.: US 12,148,586 B2
(45) Date of Patent: Nov. 19, 2024

(54) BUTTON DECK WITH NON-PENETRATING PUSHBUTTON

(71) Applicant: Aristocrat Technologies, Inc., Las Vegas, NV (US)

(72) Inventors: Garrett Hill, Las Vegas, NV (US); Samuel Villanueva, Las Vegas, NV (US); Donald Redding, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/417,163

(22) Filed: Jan. 19, 2024

(65) Prior Publication Data

US 2024/0161987 A1 May 16, 2024

Related U.S. Application Data

(60) Continuation of application No. 18/201,029, filed on May 23, 2023, now Pat. No. 11,915,897, which is a
(Continued)

(51) Int. Cl.
*G07F 17/32* (2006.01)
*H01H 13/14* (2006.01)
(Continued)

(52) U.S. Cl.
CPC ....... *H01H 36/004* (2013.01); *G07F 17/3209* (2013.01); *H01H 13/14* (2013.01);
(Continued)

(58) Field of Classification Search
CPC ... H01H 36/00–36/02; H01H 2231/008; G07F 17/3209; H01F 2007/1684
See application file for complete search history.

(56) References Cited

U.S. PATENT DOCUMENTS 6,318,721 B1 11/2001 Randall
6,545,576 B1 * 4/2003 Marchini ........... H01H 36/0006 335/205
(Continued)

FOREIGN PATENT DOCUMENTS

CN 1059288 C 12/2000
CN 106788378 A 5/2017
(Continued)

OTHER PUBLICATIONS

Suzoharp Dynamic Panel Systems, (published prior to Feb. 19, 2020), 1 page.
(Continued)

*Primary Examiner* — Ramon M Barrera
(74) *Attorney, Agent, or Firm* — Brownstein Hyatt Farber Schreck, LLP

(57) ABSTRACT

A button deck includes a substrate and a two-part non-penetrating pushbutton assembly with an upper portion positioned on an upper surface of the substrate and a lower portion positioned on a lower surface of the substrate. The upper portion includes a button face positioned in a button frame that is coupled to the upper surface of the substrate. The button face is configured to be pressed to move within the button frame toward the upper surface of the substrate. The upper portion and the lower portion are configured to work together to provide a signal to an EGM that the button face has been pressed. The pushbutton assembly is non-penetrating because it does not provide any penetration points through the substrate of the button deck.

20 Claims, 12 Drawing Sheets

Related U.S. Application Data division of application No. 17/314,861, filed on May 7, 2021, now Pat. No. 11,699,560.

(51) Int. Cl.

*H01H 36/00* (2006.01)
*H01F 7/16* (2006.01)

(52) U.S. Cl.

CPC . *H01H 36/0033* (2013.01); *H01F 2007/1684* (2013.01); *H01H 2231/008* (2013.01)

(56) References Cited

U.S. PATENT DOCUMENTS

| | | | |
|---|---|---|---|
| 8,262,480 | B2 | 9/2012 | Cohen |
| 8,462,133 | B2 | 6/2013 | Lynch |
| 8,994,666 | B2 | 3/2015 | Karpfinger |
| 9,024,908 | B2 | 5/2015 | Sinclair |
| 10,290,440 | B2 | 5/2019 | Teplitxky |
| 10,515,508 | B2 | 12/2019 | Brandau |
| 2005/0088417 | A1 | 4/2005 | Mulligan |
| 2015/0261297 | A1 | 9/2015 | Quek |
| 2019/0354224 | A1 | 11/2019 | Keylian |
| 2020/0410812 | A1 | 12/2020 | Jones |

FOREIGN PATENT DOCUMENTS

| | | | |
|---|---|---|---|
| EP | 1912231 | A2 | 4/2008 |
| EP | 3166122 | A1 | 5/2017 |
| WO | 2013114709 | A1 | 8/2013 |

OTHER PUBLICATIONS

Office Action (Notice of Allowance and Fees Due (PTOL-85)) dated Mar. 8, 2023 for U.S. Appl. No. 17/314,861 (pp. 1-7).

Office Action (Notice of Allowance and Fees Due (PTOL-85)) dated Dec. 21, 2023 for U.S. Appl. No. 18/201,029 (pp. 1-8).

* cited by examiner

BUTTON DECK WITH NON-PENETRATING PUSHBUTTON

CROSS-REFERENCE TO APPLICATIONS

This application is a division of U.S. patent application Ser. No. 18/201,029, filed May 23, 2023, which is a division of U.S. patent application Ser. No. 17/314,861, filed May 7, 2021, now U.S. Pat. No. 11,699,560, the contents of which are incorporated herein by reference as if fully disclosed herein.

BACKGROUND

Electronic gaming machines ("EGMs"), or gaming devices, provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths, or paylines, through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of win paths and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

For game play itself, player interfaces of EGMs typically include one or more buttons for activation by a player to select game preferences, activate a game sequence, or otherwise provide input to the EGM. The buttons are typically arranged in combination on a surface of the EGM cabinet that is often referred to as a "button deck". Some conventional button decks are virtual button decks that may include a display that displays virtual buttons. The virtual button decks may additionally or alternatively include one or more mechanical pushbuttons. These mechanical pushbuttons may be dynamic in that their appearance may be electronically changed via changing the graphics, colors, videos, or animations in a video display beneath the pushbuttons to accommodate different wagering games or appearances. EGMs are often used in settings where food and/or drinks are consumed while the games are played, such as in a bar, restaurant, or casino. Some conventional virtual button decks include one or more mechanical pushbuttons that extend through the display of the virtual button deck such that the plunger mechanism of the pushbutton can reach through the display to connect the switch and harness underneath the display. These conventional pushbuttons require cutouts, holes, or other penetration points through the display of the virtual button deck which allow liquid or debris to penetrate the virtual button deck and access electronics of the EGM. This can result in interference with the EGM (e.g., disable, shutdown, damage, etc.) which can be costly and inconvenient. Additionally, the holes, cutouts, or other penetration points add stress points that can increase the rate of failure of the display. Accordingly, a virtual button deck assembly with a non-penetrating pushbutton is desirable to prevent damage to the virtual button deck and other sensitive electronics of the EGM.

SUMMARY

Embodiments provide an input interface assembly, such as a button deck (which may be a virtual button deck (VBD)) that includes a non-penetrating pushbutton assembly, such that it does not include holes, openings, channels, or other penetration points through the substrate (e.g., glass, cabinet, display, screen, etc.) of the button deck. Some embodiments include a two-part non-penetrating pushbutton assembly with an upper portion (or upper button assembly) positioned on an upper surface of the substrate of the button deck and a lower portion (or lower button assembly) positioned on a lower surface of the substrate. The upper and lower portions communicate or otherwise coordinate without any physical connection to provide a signal to the EGM when the button face of the pushbutton assembly is pressed. The lower portion detects that the button face has been pressed, without the upper portion communicating via a physical cable. The upper portion does not receive any power via a physical cable or a relay in glass of the substrate. Since the upper portion of the non-penetrating button assembly does not need to interface with a power or communication cable, no overlay, panel, housing, or the like is needed to cover some or all of the upper portion or any cables connected to the upper portion. In some examples, the upper portion of the non-penetrating pushbutton assembly sits on top of the button deck such that the EGM or button deck does not include an overlay or covering positioned over the upper portion of the non-penetrating pushbutton assembly, for example with a cutout for the upper portion.

An embodiment provides a button deck for an electronic gaming machine (EGM). The button deck includes a substrate and a non-penetrating pushbutton assembly. The substrate has an upper surface and a lower surface. The non-penetrating pushbutton assembly includes an upper portion and a lower portion. The upper portion is positioned at the upper surface of the substrate and includes a button frame, a button face positioned within the button frame, and magnets coupled to the button face. The button face is positioned in the button frame and can be pressed such that the button face moves within the button frame toward the upper surface of the substrate. The lower portion is positioned at the lower surface of the substrate and includes at least one electromagnet, and a control board electrically coupled to the electromagnet. The electromagnet is positioned such that it is aligned with one or more of the magnets. The control board drives the electromagnet to create a magnet field. The control board also identifies a fluctuation in power required to drive the electromagnet caused by a magnetic field of the magnets interacting with the magnetic field of the electromagnet when the button face is pressed by a player. The control board also sends a signal to the EGM that the button face has been pressed.

Another embodiment provides an input interface assembly for an electronic gaming machine (EGM) that includes a substrate and a non-penetrating pushbutton assembly. The substrate defines and upper surface and a lower surface. The non-penetrating pushbutton assembly includes an upper assembly and a lower assembly. The upper assembly is positioned at the upper surface of the substrate and includes a button frame coupled to the upper surface of the substrate, a button face positioned in the button frame, an upper induction coil positioned in the button frame, a biasing mechanism, and an upper control board electrically coupled to the upper induction coil, and at least one switch. The button face is positioned in the button frame and can be pressed such that the button face moves within the button frame toward the upper surface of the substrate. The biasing mechanism biases the button face away from the upper surface of the substrate. The at least one switch is positioned in the button frame such that the switch is closed when the button face is pressed. The lower assembly is positioned at the lower surface of the substrate and includes a lower induction coil positioned to power the upper induction coil, and a lower control board electrically coupled to the lower induction coil. The lower induction coil powers the upper induction coil such that the upper induction coil powers the upper control board. The upper control board signals the lower assembly when the switch is closed and in response the lower control board signals the EGM that the button face has been pressed.

Another embodiment provides a button deck for an electronic gaming machine (EGM) that includes a substrate and a non-penetrating pushbutton assembly. The non-penetrating pushbutton assembly includes an upper portion and a lower portion. The upper portion is positioned at an upper surface of the substrate and includes a button frame coupled to the upper surface of the substrate, a button face positioned in the button frame, a pivotable reflective surface positioned between the button face and the substrate, and a biasing mechanism. The button face can be pressed such that the button face moves within the frame toward the upper surface of the substrate from an unpressed position to a pressed position. The pivotable reflective surface pivots based on movement of the button face. The biasing mechanism biases the button face away from the upper surface of the substrate. The lower portion is positioned at a lower surface of the substrate and includes a light source and a light sensor. The light source directs a light beam toward the reflective surface and the light sensor detects the light beam reflected from the reflective surface. The position of the button face determines whether the light sensor detects the beam of light reflected from the reflective surface. The light sensor signals the EGM when the button face has been pressed.

DETAILED DESCRIPTION

Figure 1:
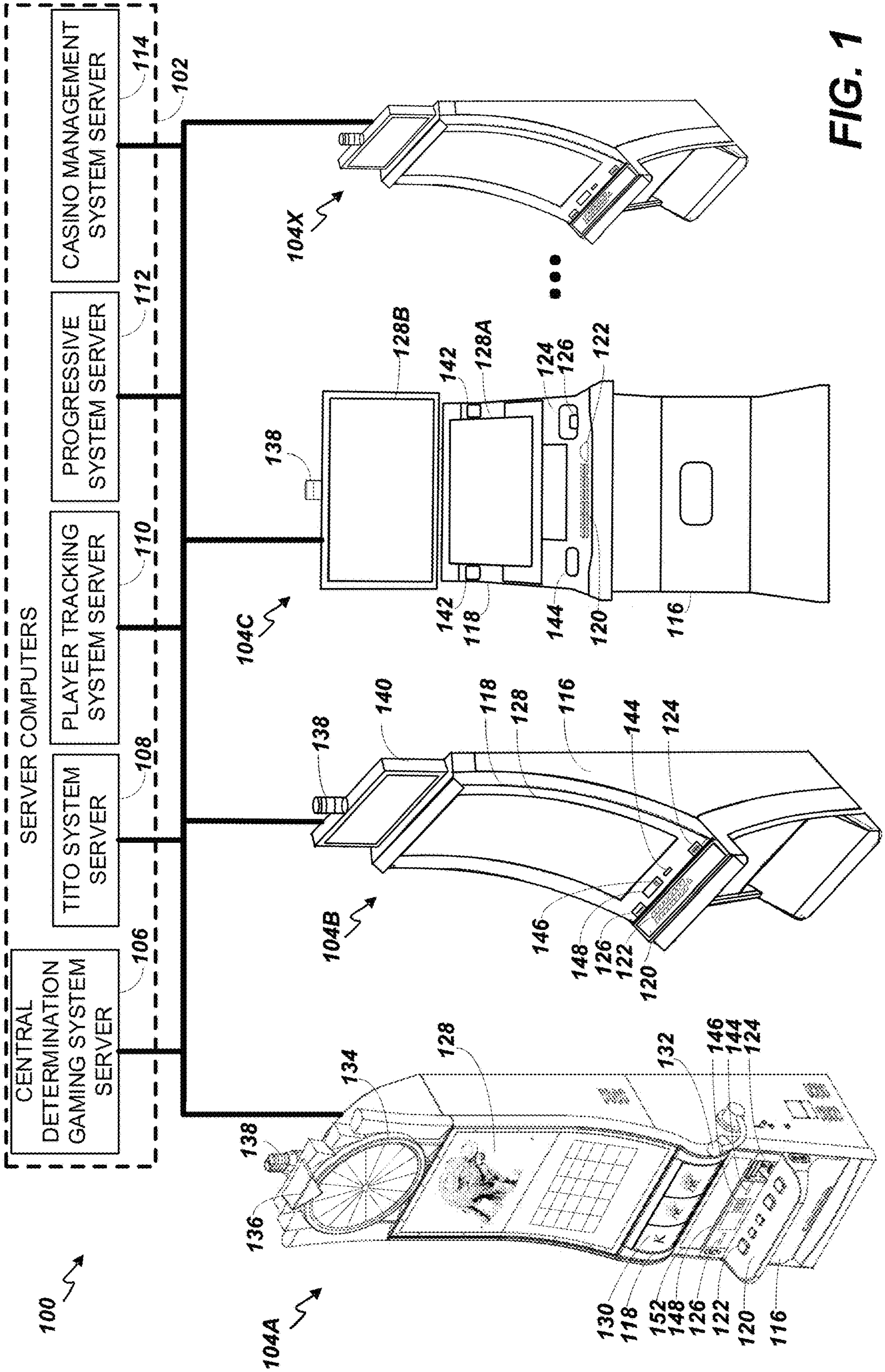
FIG. 1 is an exemplary diagram showing several EGMs networked with various gaming related servers.

The present disclosure is generally directed to providing an input interface assembly, such as a button deck, with at least one non-penetrating pushbutton assembly. In some examples, the button deck includes a substrate (e.g., glass, screen, display, housing, etc.) underneath at least one button. In at least one example, the button deck is a virtual button deck (VBD). Some conventional button decks include one or more pushbuttons that extend through openings in the substrate of the button deck, introducing penetration points for liquid and debris, which can be harmful to electronics and other aspects of the EGM. Generally, embodiments include a button deck with a non-penetrating pushbutton assembly that includes an upper portion (or upper button assembly) including a button face within a button frame that is positioned on an upper surface of the substrate of the button deck. Some embodiments also include a lower portion (or lower button assembly) positioned at a lower side of the substrate of the button deck, such that the non-penetrating pushbutton assembly does not extend through the substrate of the button deck and does not include or require penetration points through the button deck. Further, since the non-penetrating pushbutton does not include or require any physical cables or electrical connections above the button deck that physically connect with a lower assembly or the EGM, embodiments do not include an overlay or covering to hide or protect such connections. Instead, the upper portion of the non-penetrating assembly sits on top of the button deck without penetration points or physical connections to the electronics of the EGM.

Some embodiments provide a magnetic non-penetrating pushbutton assembly with an upper portion including static magnets positioned on the button face and the lower portion including electromagnets, such that when the button face is pressed, the magnetic field of the static magnets is pushed into the opposing field of the electromagnetics, and the fluctuation in power required to drive the electromagnets signals to the EGM that the pushbutton has been pressed. Some embodiments provide an active induction non-penetrating pushbutton assembly with an upper portion that includes an upper induction coil, a biasing mechanism, one or more switches, and an upper control board. The lower portion includes a corresponding lower induction coil and a lower control board. When the button face is pressed, the button face closes the one or more switches of the upper portion and the upper control board signals through the corresponding induction coils that the pushbutton was pressed. When the lower control board identifies that the pushbutton has been pressed, it sends the signal to the EGM.

Some embodiments provide an optical non-penetrating pushbutton assembly with an upper portion that includes a pivotable reflective surface and a biasing element. The lower portion includes a light source and one or more light sensors, such that when the button face is pressed the reflective surface pivots and the one or more light sensors indicate to the EGM that the pushbutton has been pressed. Some embodiments provide a hidden touch non-penetrating pushbutton assembly with an upper portion that includes capacitive stylus numbs, such that when the button face is pressed the stylus nubs come in contact with a touchscreen portion of the upper surface of the display. The touch from the stylus nubs signals the EGM that the button face has been pressed.

For purposes of this disclosure, the term "non-penetrating pushbutton" or "non-penetrating pushbutton assembly" means a pushbutton that does not extend through or otherwise include a penetration point (such as a hole, channel, opening, lumen, cutout, etc.) through or into the substrate of the input interface assembly, but that is able to provide a signal to an EGM when the pushbutton has been actuated (the button face has been pressed). The terms "upper" and "lower" are used relative to a generally horizontal input interface assembly for the ease of illustration and description, but it should be understood that these relative terms can also mean "front" and "back" with regard to a generally vertical input interface assembly, or "first" and "second" sides relative to a input interface (e.g. button deck, the substrate) of any orientation. The term "two-part non-penetrating pushbutton" or "two-part non-penetrating pushbutton assembly" means a non-penetrating pushbutton as described above with an upper portion positioned above a substrate of a button deck and a lower portion positioned below the substrate of the input interface assembly. The lower portion of the two-part non-penetrating pushbutton is electrically coupled to, or otherwise in communication with, the EGM, such that the lower portion sends the signal to the EGM for the two-part non-penetrating pushbutton assembly, while the upper portion is not directly connected to or interfaced with any power cable or communication cable from the EGM or the lower assembly. In at least one example, the upper-portion of the two-part non-penetrating pushbutton assembly is completely self-contained such that it can be placed or otherwise fixed to the top of the substrate of the button deck without any further connections, or any overlays or covers. For purposes of this disclosure, the term "substrate" means any portion of an input interface assembly that includes two opposing surfaces (e.g., upper and lower surface) such that an upper pushbutton assembly as described may be attached to the upper surface, for example, a housing, a sheet of glass, a sheet of plastic, a screen, a display, a combination of these, or the like. For ease of description and illustration, the terms "substrate" and "display" may be used interchangeably, although a display is just one of the possible substrates captured by the present disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In some examples, the buttons 122 in the button deck 120 can be physical buttons, or other player-actuatable selection elements, such as switches, dials, knobs, and the like. In further examples, the button deck 120 can be a virtual button deck and can be, or include, a display, such as a capacitive touchscreen. The buttons 122 can be virtual buttons, or other selection elements, that can be actuated through suitable player interaction (e.g., by performing pressing, swiping, dragging, or similar actions on the display of the virtual button deck 120). The virtual button deck can include a combination of pushbuttons and virtual buttons. Suitable virtual button decks 120 include the virtual button deck included in the Helix XT™ model gaming device manufactured by Aristocrat® Technologies, Inc. Although described with respect to the gaming device 104A, the button decks 120 of one or both of gaming devices 104B or 104C can be virtual button decks having virtual buttons 122 and/or pushbuttons 122.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), win paths (e.g. paylines), pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
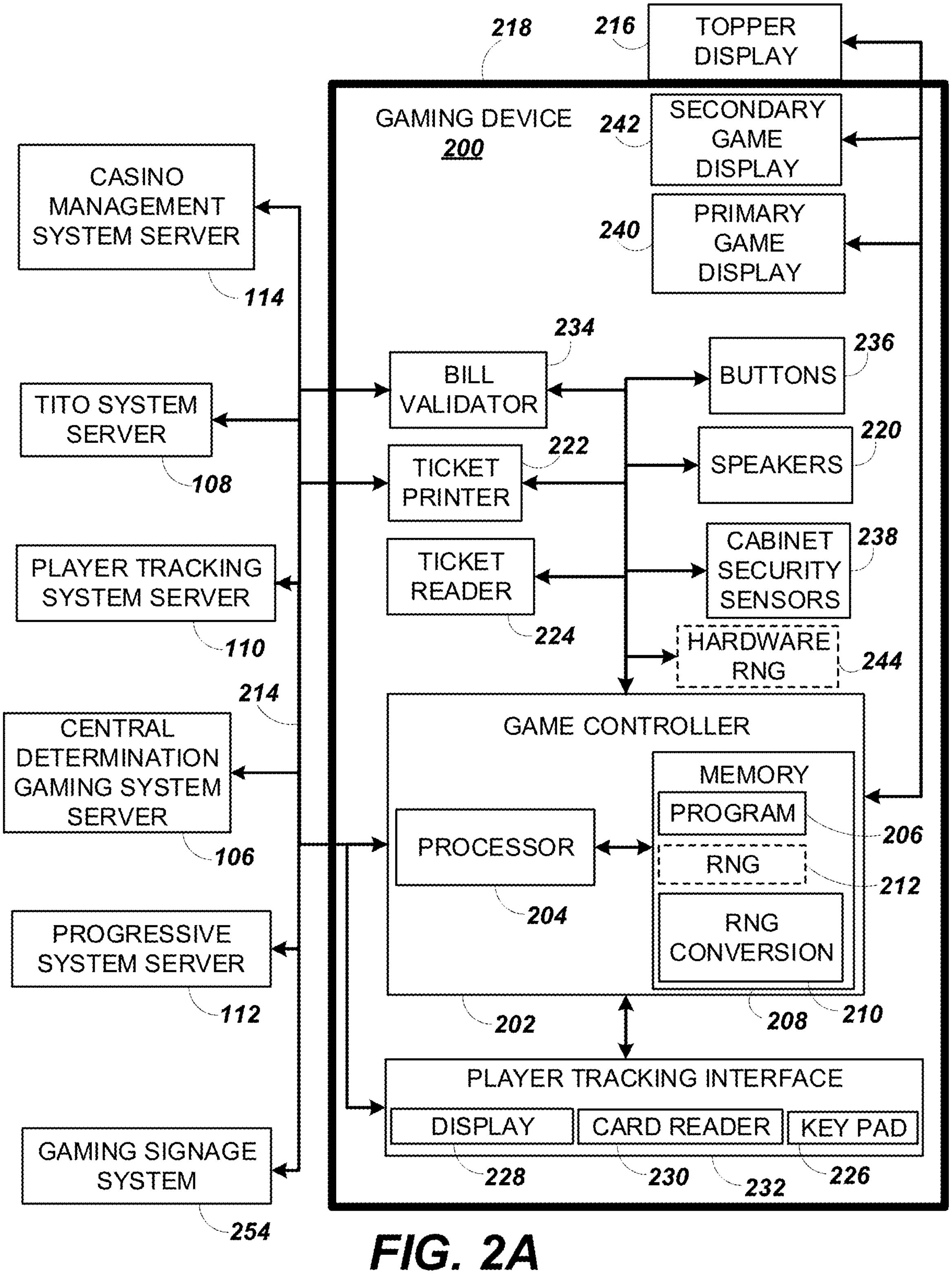
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility. A weighted table is one type of lookup table and the two terms can be used interchangeably throughout the present disclosure.

The lookup tables, in the form of weighted tables, can have one of many possible configurations. In general, a weighted table can be implemented as any data structure that assigns probabilities to different options, in order for one of the different options to be selected using a random number. Different options are represented in different entries of a weighted table. For example, there may be multiple possible values within each tier of the weighted table, and the multiple possible values may be unequally weighted. The probabilities for different options can be reflected in threshold values (e.g., for a random number RND, generated by an RNG, in the range of $1<RND<=40$ for option 1, $40<RND<=70$ for option 2, $70<RND<=90$ for option 3, and $90<RND<=100$ for option 4, given four options and a random number RND where $0<RND<=100$). The threshold values can represent percentages or, more generally, subranges within the range for a random number. In some example implementations, the threshold values for a weighted table are represented as count values for the respective entries of the weighted table. For example, the following table shows count values for the four options described above:

TABLE 1

| Example Weighted Table | |
|---|---|
| count value | entry |
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and predetermined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
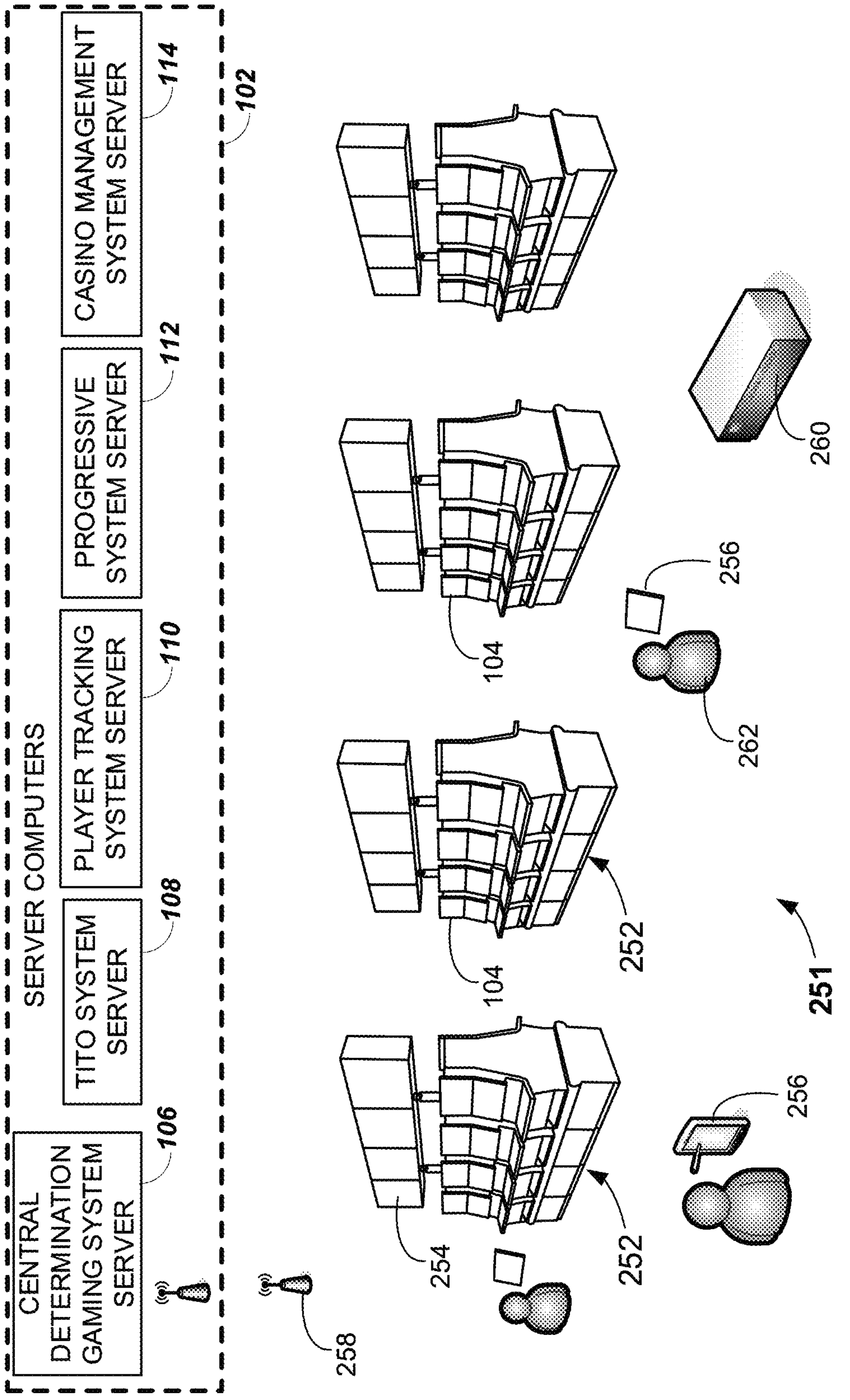
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button, a virtual button (e.g., a button provided via a graphical user interface on a virtual button deck), or a dynamic pushbutton in some instances. In some such examples, the mobile gaming device 256 may send a “cash out” signal to a kiosk 260 via a wireless link in response to receiving a “cash out” indication from a casino patron. The kiosk 260 may provide monetary credits to the casino patron 262 corresponding to the “cash out” signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron’s player loyalty card, a patron’s smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
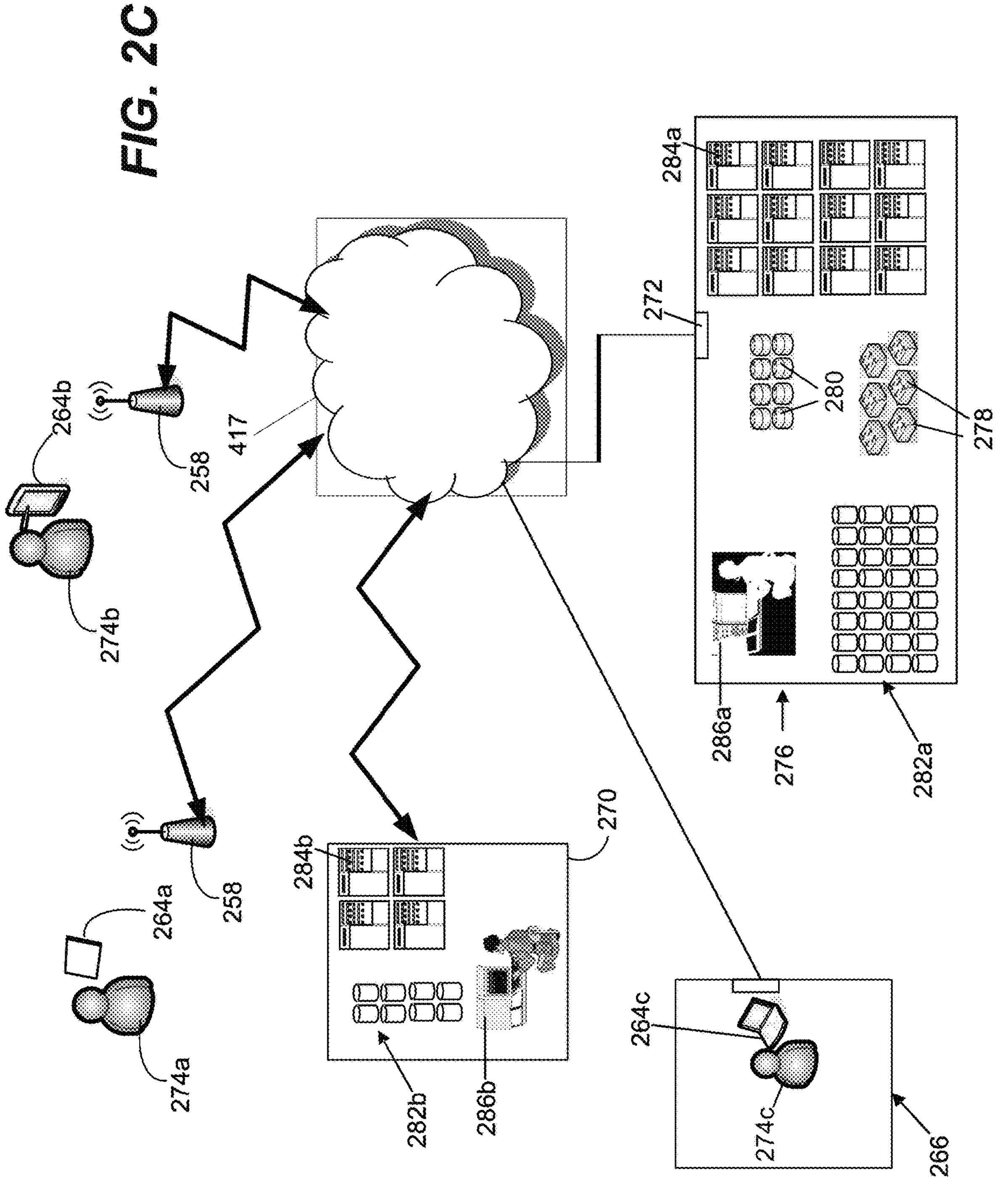
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
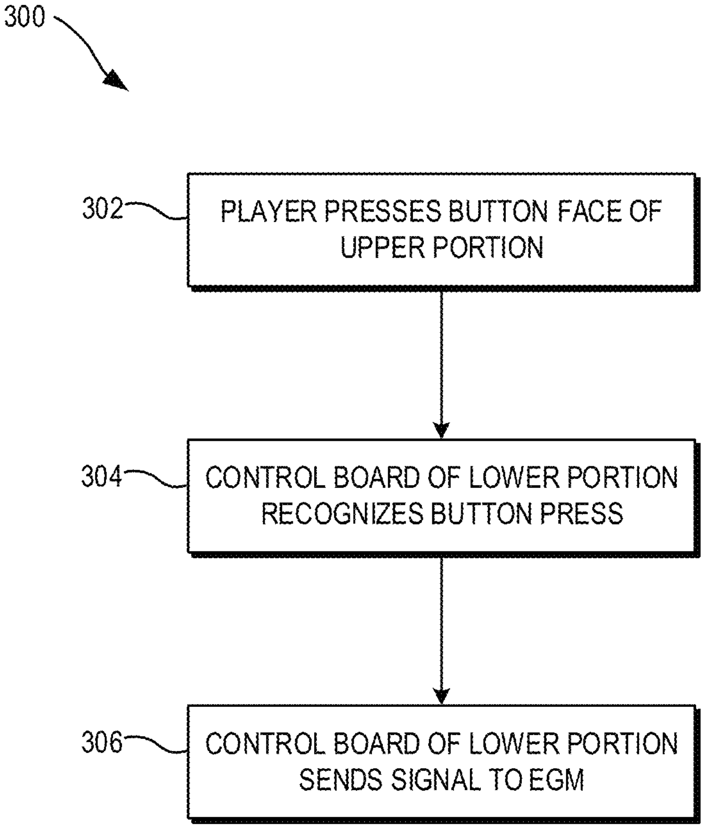
FIG. 3 is a flowchart illustrating an example method of using a two-part non-penetrating pushbutton assembly, in accordance with at least one embodiment.

FIG. 3 is a flowchart illustrating an example method 300 of using a two-part non-penetrating pushbutton assembly, such as will be described in greater detail with reference to FIGS. 5A-7E. The two-part non-penetrating pushbutton assembly includes two separate portions: an upper portion (or upper assembly) positioned above a display and a lower portion (or lower assembly) positioned below the display. The upper portion and lower portion are physically separated by the display and are not connected through penetration points in the display or by cables, etc. At block 302 a player presses a button face of the upper portion such that the button face moves within a button frame of the upper portion toward an upper surface of the display. The upper portion may also include one or more magnets (e.g., see FIGS. 5A and 5B), one or more biasing elements (e.g., see FIGS. 6A-7D), one ore more upper control boards (e.g., see FIGS. 6A and 6B), one or more upper induction coils (e.g., see FIGS. 6A and 6B), one or more switches (e.g., see FIGS. 6A and 6B), one or more pivotable reflective surfaces (e.g., see FIGS. 7A-7E), a combination of these, or the like.

At block 304, the control board of the lower portion recognizes that the button of the upper portion has been pressed. For example, the lower portion may include at least one electromagnet that is driven by the control board to create a magnetic field, such that when the button face of the upper portion is pressed magnets in the upper portion change the power required to drive the electromagnet and the control board can recognize the fluctuation in power required as a button press (e.g., see FIGS. 5A and 5B). In another example, the lower portion may include a lower induction coil configured to wirelessly power an upper induction coil positioned in the upper portion, which is coupled to an upper control board and one or more switches positioned in the upper portion. When the player presses the button at block 302, the button face closes the one or more switches, the upper control board (powered by the upper induction coil, which is wirelessly powered by the lower induction coil) wirelessly signals the lower control board that the button face has been pressed (e.g., see FIGS. 6A and 6B). In still another example, the lower may include a light sensor coupled to the control board and a light source, such that when the button face is pressed it moves a pivotable reflective surface to change the direction of the light beam provided by the light source and the control board recognizes a button press based on whether the light sensor senses the light beam from the light source (e.g., see FIGS. 7A-7E).

At block 306, the control board of the lower portion sends a signal to the Electronic Gaming Machine (EGM) that the button has been pressed. For example, the control board of the lower portion may be coupled to the EGM via cables or other interfaces that provide power to the lower portion, allow for communication between the lower portion and the EGM, or both. That is, while the wireless upper portion is isolated from the lower portion and the EGM electronics by at least the display, the lower portion is directly coupled to the EGM electronics. The described method 300 for using a two-part non-penetrating pushbutton allows for the EGM to receive signal that the player has pushed the button without requiring penetration points through the display, without requiring cables or other interfaces between the upper portion and electrical components of the EGM, and without requiring an overlay or other covering over the upper portion (e.g. with a cutout for the button face) to protect the electronics.

Figure 4:
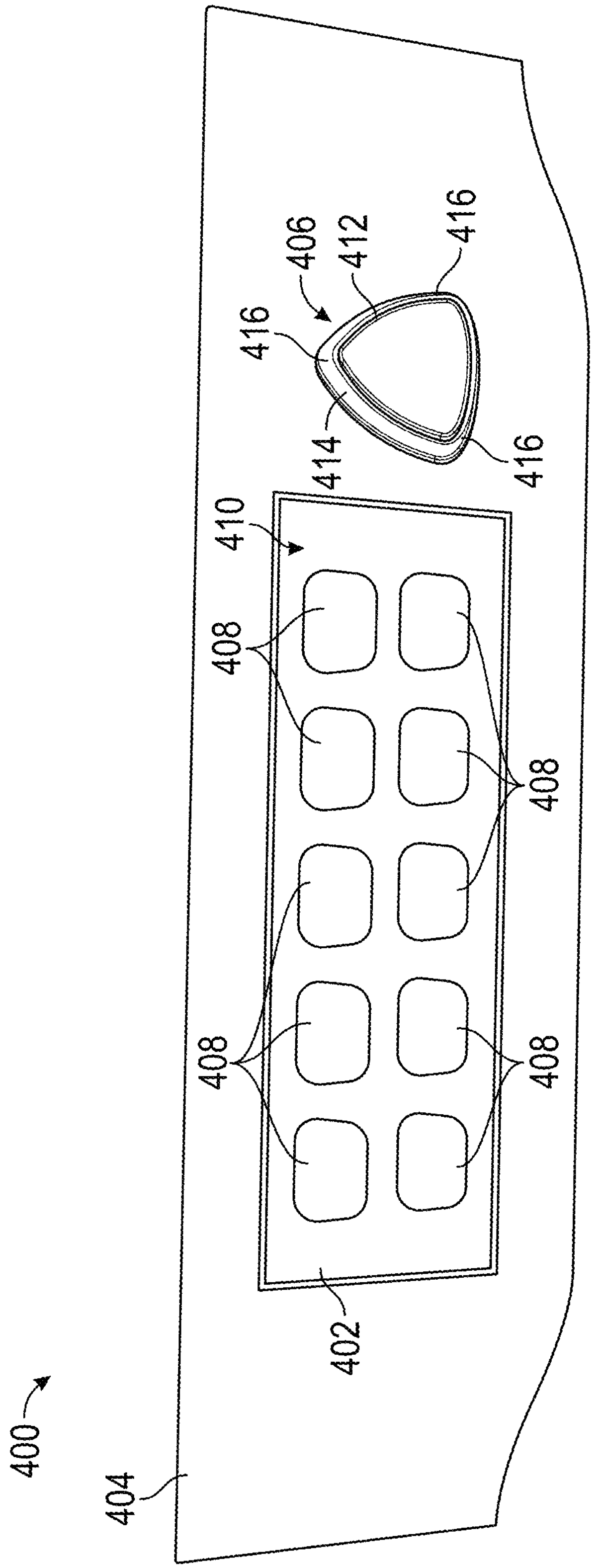
FIG. 4. is a perspective view of a virtual button deck, in accordance with at least one embodiment.

FIG. 4. is a perspective view of a button deck 400, that includes a display 402, a housing 404, and a non-penetrating pushbutton assembly 406. The button deck 400 can include electronics and other connection mechanisms such that it can be incorporated in any of a variety of EGMs, such as described with reference to the button decks 120 in FIG. 1. The display 402 is positioned within the housing 404 and extends beneath the non-penetrating pushbutton assembly 406, such that the non-penetrating pushbutton assembly 406 can be a dynamic pushbutton. In some embodiments the housing may cover more or less of an upper surface 410 of the display 402. In some examples the display 402 includes a sheet of glass positioned over a liquid crystal display (LCD), plasma, light emitting diode (LED), organic light emitting diode (OLED), or the like. In some examples, the display 402 includes at least one portion that is a touchscreen. In the illustrated example, the button deck 400 is a virtual button deck (VBD), such that the display 402 of the virtual button deck 400 is configured to display one or more virtual buttons 408 that allow a player to make a selection by touching the display 402 at the image of the virtual button 408. In some examples, the virtual buttons 408 may be dynamic pushbuttons that include a physical button component over the display 402, such that images of the display 402 show through the physical button.

The non-penetrating pushbutton assembly 406 includes a button face 412 positioned in a button frame 414 such that the button frame 414 restricts movement of the button face 412. The button frame 414 may be coupled to the display 402 or the housing 404. In some examples, the button frame 414 is coupled to the display 402 via an adhesive. In at least one example, the adhesive is an adhesive that is immune to traditional cleaners. The button face 412 comprises a transparent material such that images on the display 402 can be seen through the button face 412. In the example illustrated, the display 402 is displaying the word "PLAY" underneath the non-penetrating pushbutton assembly 406, such that the word "PLAY" is transferred through or otherwise visible through the button face 412. In at least one example, the button face 412 includes an optical block. In some examples at least a portion of the button face 412 may be formed of a clear plastic or glass. In some examples, the button frame 414 may be manufactured from any suitable materials, such as, for examples, plastic, metal, wood, glass, or the like.

In the illustrated example, the non-penetrating pushbutton assembly 406 is in the shape of a Reuleaux triangle with three lobes or corners 416. In other examples the non-penetrating pushbutton assembly 406 may be any of a variety of shapes, including but not limited to, a circle, a triangle, a square, a pentagon, a hexagon, an oval, an alphanumeric character, a symbol, another shape, or the like. Further, while the illustrated example includes a button frame 414 in the same general shape as the button face 412, in other examples, the button frame 414 and the button face 412 may comprise different shapes so long as the non-penetrating pushbutton assembly can function as described with regard to one or more embodiments. Additionally, while the illustrated non-penetrating button 406 includes three lobes or corners 416, other examples may include more or less lobes or corners 416.

Figure 5A:
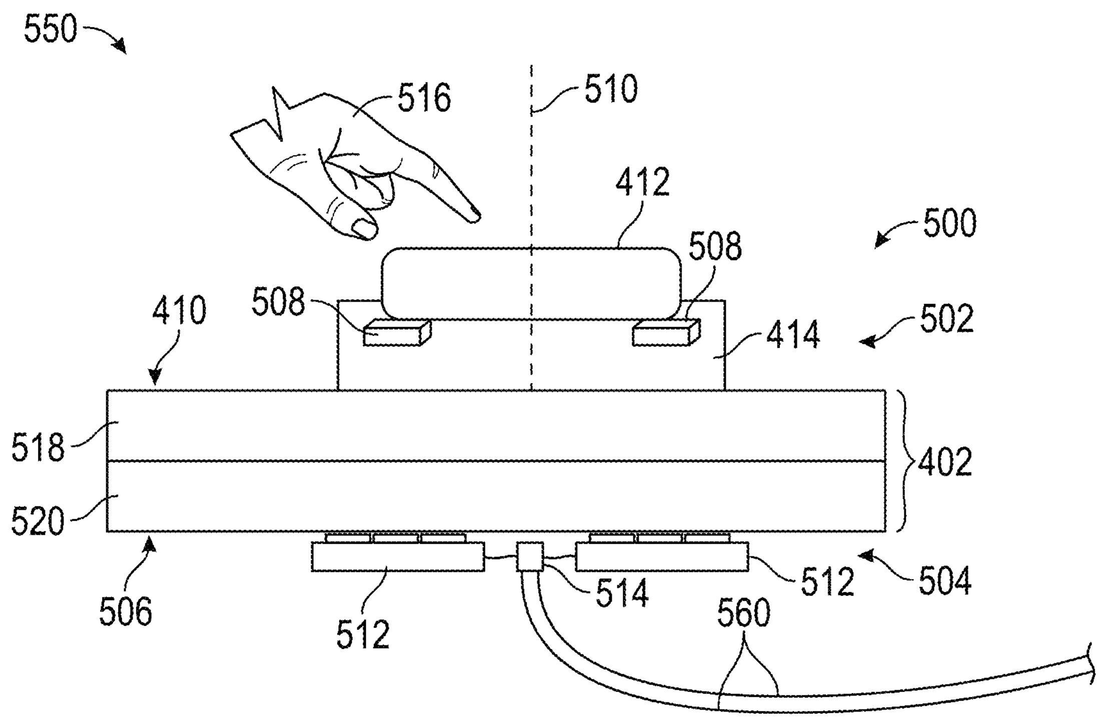
FIG. 5A is a partial cross-section view of a magnetic non-penetrating pushbutton assembly in an unpressed position, in accordance with at least one embodiment.
Figure 5B:
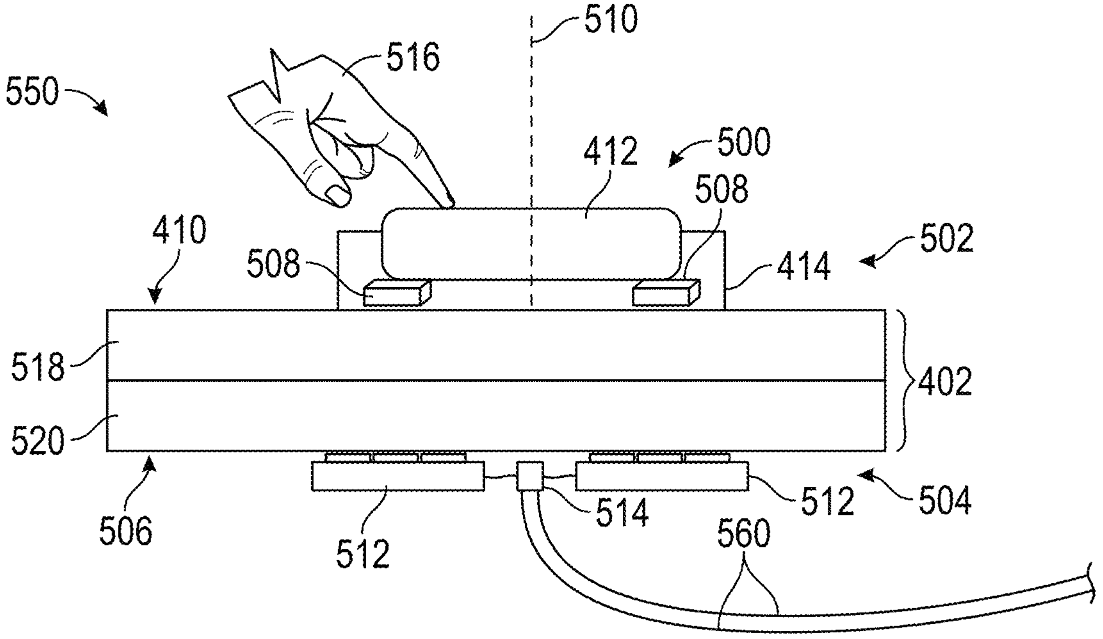
FIG. 5B is a partial cross-section view of a magnetic non-penetrating pushbutton assembly in a pressed position, in accordance with at least one embodiment.

FIG. 5A is a partial cross-section view of a magnetic non-penetrating pushbutton assembly 500 in an unpressed position and FIG. 5B is a partial cross-section view of the magnetic non-penetrating pushbutton assembly 500 in a pressed position. The non-penetrating pushbutton assembly is a two-part non-penetrating pushbutton and includes an upper portion 502 positioned on an upper surface 410 of the display 402 and a lower portion 504 positioned on a lower surface 506 of the display 402. The upper portion includes a button face 412 positioned in a button frame 414 and one or more magnets 508 coupled to the button face 412. The button frame 414 allows movement of the button face 412 within the button frame 414 along an axis 510 extending perpendicular to the upper surface 410 of the display 402. In at least one example, the button frame 414 allows movement of the button face 412 in mainly the z-axis with limited motion in the x-axis or y-axis. In some examples, the button frame 414 is manufactured out of a light diffusing material, such that diffused light from the display 402 is visible through the button frame 414. The display 402 can illuminate within the perimeter of the button frame 414 in a defined radius to achieve a simulated halo light. In some embodiments, the button frame comprises a translucent polymer, for example, a light diffusing plastic.

The illustrated example shows two magnets 508 coupled to a lower surface of the button face 412, but other examples may include more or less magnets 508. In some examples the magnets 508 are positioned in lobes 418 or otherwise around a perimeter of the button face 412 or hidden by the button frame 414 so as to avoid the magnets 508 being visible through the button face 412 or so as to avoid interference with the image of the display 402 showing through the button face 412. In at least one example, the upper assembly 502 includes at least three static magnets 508. In some examples, the magnets 508 are rare-earth magnets. In at least one example, the magnets 508 are small neodymium magnets. The magnets 508 may be mounted anywhere on the button face 412, including on the lower surface, on the sides, embedded within the button face 412, or the like.

The lower portion 504 includes at least one electromagnet 512 positioned such that it is aligned with a magnet 508 and a control board 514. While the illustrated example shows two electromagnets 512, other examples can include more or less electromagnets 512. In at least one example, the lower portion 504 includes one electromagnet 512 per static magnet 508. The electromagnet 512 can be configured with a variable strength and can be reversable. The control board 514 is electrically coupled to the at least one electromagnet 512 and is configured to drive the electromagnet 512 to create a magnetic field, control the strength of the magnetic field based on the power supplied to the electromagnet 512, control the direction of the magnetic field, etc. When the button face 412 is pressed by a player 516, the button face 412 and static magnets 508 move along the axis 510 toward the upper surface 410 of the display 402. The control board 514 can identify a fluctuation in power required to drive the electromagnet 512 caused by a magnetic field of the magnets 508 interacting with the magnetic field of the electromagnet 512 as the magnets 508 move toward the electromagnet 512. The fluctuation in power required can indicate that the button face 412 of the non-penetrating button assembly 500 has been pressed by the player 516. Accordingly, the control board 514 sends a signal to the EGM indicating that the button face 412 has been pressed. In some examples, the control board 514 of the lower portion 504 is coupled to one or more cables 560, for example, power cables, communication, cables, a combination of these, or the like. In at least one example, the lower portion 504 communicates with the EGM through cables 560. The upper portion 502 communicates wirelessly (i.e., via magnets 508) with the lower portion 504, such that any cables or wires or other physical connections connected to the EGM or the lower portion 504 are not directly coupled to the upper portion 502. That is, the upper portion 502 does not require any cables connecting it to the lower portion 504 or the EGM, and the upper portion 502 does not include or require an overlay to hide or protect such cables or to connect the upper portion 502 to the button deck 550. As such, the two-part non-penetrating pushbutton 500, via the upper portion 502 and the lower portion 504, allows the player 516 to press a physical pushbutton that signals the EGM that the pushbutton has been pressed, without requiring any penetration points through the display 402 of the button deck 550.

In some examples the control board 514 can change the force required to press the button face 412 by controlling the intensity of the electromagnet 512 and the magnetic field it creates. The control board 514 can turn off or otherwise stop powering the electromagnet 512 to disable the non-penetrating pushbutton assembly 500, since without the magnetic field created by the electromagnet 512, the button face 412 would fall toward the upper surface 410 of the display 402. The control board 514 can control the intensity and direction of the electromagnet 512 to rattle or otherwise move the button face 412 in the button frame 414 or to provide haptic feedback to the player 516. The ability to control the resistance of the pushbutton assembly 500, movement of the button face 412 within the pushbutton assembly 500, the minimum force required to actuate the pushbutton assembly 500, and disabling/enabling the pushbutton assembly 500 provides enhanced game features including an improved user experience by varying the type of interaction with the pushbutton assembly 500 and the effects of various player input. The pushbutton assembly 500 can be calibrated to determine the appropriate field-effect intensities needed to indicate when the button face 412 has been pressed.

The magnetic non-penetrating pushbutton assembly 500 is illustrated as part of a virtual button deck 550 (a portion of which is shown). In the illustrated example, the display 402 includes a layer of glass 518 over a screen 520, such as a liquid crystal display (LCD), plasma, light emitting diode (LED), or organic light emitting diode (OLED), however other examples may include any type of display. Further, examples of a magnetic non-penetrating pushbutton assembly 500 may utilize different or additional components in the upper portion 502 or the lower portion 504 than those illustrated. For example, signal-only magnets can be placed on the horizontal edges of the button face 412 and corresponding field-effect sensors can be positioned on the lower surface 506 of the display 402 to allow for a simple electro-magnet driving circuit to monitor when the button face 412 is pressed. Various examples of the magnetic non-penetrating pushbutton assembly 500 provide a number of technical improvements and advantages. In some examples the magnetic non-penetrating pushbutton assembly 500 may do one or more of the following: allow for a low-cost service replicable upper portion 502, provide support for backward compatibility with existing software, reduce or remove risk of liquid or debris entering the virtual button deck 550 by not including any penetration points through the display 402, reduce the risk of cracking of the display 402 by not including penetration points, allow for easy replacement of the upper portion 502, for example, using solvent to remove adhesive without the need to open the EGM., provide simulated or wireless halo lighting using the control board 512 as a halo light edge light board, allow for improved control of the button face 412, including moving, disabling, rattling, providing haptic feedback, controlling resistance against a press by the player 516, controlling threshold force required to press the button face 412, etc., allow for button count or placement to be adjusted without modifications to the virtual button deck 550 by repositioning the lower portion 504 to align with the desired location of the upper portion 502.

Figure 6A:
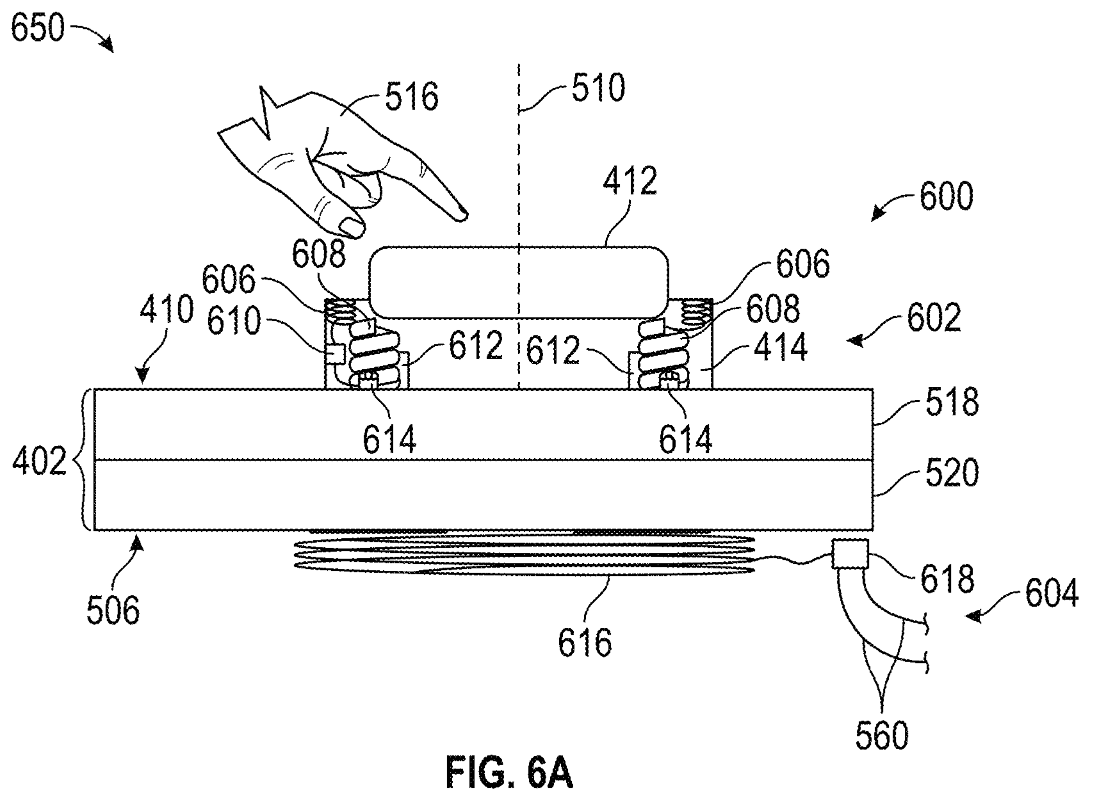
FIG. 6A is a partial cross-section view of an active induction non-penetrating pushbutton assembly in an unpressed position, in accordance with at least one embodiment.
Figure 6B:
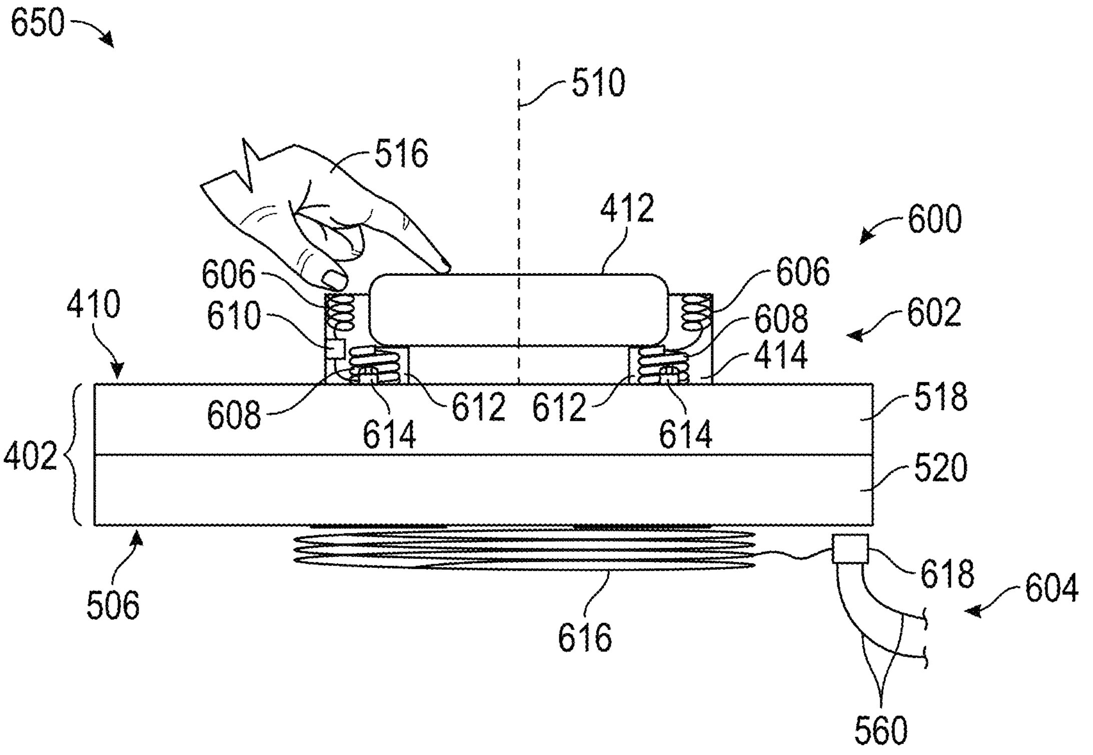
FIG. 6B is a partial cross-section view of a active induction non-penetrating pushbutton assembly in a pressed position, in accordance with at least one embodiment.

FIG. 6A is a partial cross-section view of an active induction non-penetrating pushbutton assembly 600 in an unpressed position and FIG. 6B is a partial cross-section view of the magnetic non-penetrating pushbutton assembly 600 in a pressed position. The active induction non-penetrating pushbutton assembly 600 is a two-part non-penetrating pushbutton assembly that is part of a button deck 650 for an EGM and includes a display 402, an upper portion 602 positioned on an upper surface 410 of the display 402, and a lower portion 604 positioned on a lower surface 506 of the display 402. The upper portion 602 includes a button face 412 positioned in a button frame 414, as described with reference to FIGS. 4-5B. The upper portion 602 further includes an upper induction coil 606 positioned in the button frame 414, a biasing mechanism 608 positioned to bias the button face 412 away from the upper surface 410 of the display 402, an upper control board 610 electrically coupled to the upper induction coil 606, and at least one switch 612 positioned in the button frame 414 such that the switch 612 is closed when the button face 412 is pressed. In some examples, the upper portion 602 additionally includes one or more lights 614 positioned in the button frame 414, for example, light-emitting diodes (LEDs), fluorescent tubes, optical fibers, or the like, which may serve as halo lights. In at least one example, the upper induction coil 606 is embedded in the button frame 414. While the illustrated example includes a single upper induction coil 606 extending through the button frame 414 in a circle around the button face 412, other examples may include more than one upper induction coils 606 in different positions.

The illustrated example shows two biasing elements 608, but other examples may include more or less biasing elements 608. Further, in the illustrated example the biasing elements 608 are linear springs positioned between an upper surface of the display 402 and a lower surface of the button face 412. In other examples, the biasing mechanism 608 includes static magnets, electromagnets, or a combination thereof positioned in an opposing fashion within the button frame 414 such that the button face 412 is biased via magnetic suspension. In the illustrated example, the non-penetrating pushbutton 600 includes two switches 612 positioned at a perimeter of the button face 412, such that when the button face is in the unpressed position (FIG. 6A) the button face 412 does not contact the switches 612, but when the player 516 presses the button face 412 toward the upper surface 410 of the display, the button face 412 contacts the switches 612. Other examples may include more or less switches 612 which may be positioned anywhere within the upper portion 602 that allows for the switch to indicate when the button face 412 has been pressed. The switch may be any of a variety of switches, for example, a photogate, a magnetic field effect sensor, a mechanical switch, and the like. In various examples, one or more components of the upper portion 602 (e.g., biasing mechanism 608, upper control board 610, switch 612, lights 614) may be positioned in a perimeter of the button frame 414, in a lobe or corner 416 of the upper portion 602, or under a perimeter of the button face 412, such that they are not visible through the button face 412.

The lower portion 604 includes a lower induction coil 616 and a lower control board 618. The lower induction coil 616 is positioned to power the upper induction coil 606. While the illustrated example includes a single lower induction coil 616 aligned with the upper induction coil 606, some examples may include more than one lower induction coil 616. The lower control board 618 is electrically coupled to the lower induction coil 606 and the upper control board 610 is electrically coupled to the upper induction coil 606, the one or more switches 612, and in some examples, lights 614. In some examples, the control board 618 of the lower portion 604 is coupled to one or more cables 560, for example, power cables, communication, cables, a combination of these, or the like. In at least one example, the lower portion 604 communicates with the EGM through cables 560. The upper portion 602 communicates wirelessly with the lower portion 604, such that any cables or wires or other physical connections connected to the EGM or the lower portion 604 are not directly coupled to the upper portion 602. That is, the upper portion 602 does not require any cables connecting it to the lower portion 604 or the EGM, and the upper portion 602 does not include or require an overlay to hide or protect such cables or to connect the upper portion 602 to the button deck 650. When the player 516 presses the button face 412 closing one or more of the switches 612, the upper control board 610 wirelessly signals the lower portion 604 via the upper induction coil 606 and the lower induction coil 616, such that the lower control board 618 sends a signal to the EGM that the player 516 has pressed the button face 412. As such, the non-penetrating pushbutton 600, via the upper portion 602 and the lower portion 604, allows the player 516 to press a physical pushbutton that signals the EGM that the pushbutton has been pressed, without requiring any penetration points through the display 402 of the virtual button deck 650.

Some examples may use electromagnetic suspension as described with reference to FIG. 5. In those examples, the lower control board 618 may be used to control the intensity and direction of electromagnets in the button frame 414. In some examples, the lower control board 618 may also monitor the power required to detect when the button face 412 is pressed based on the field-effect, which may be used instead of or in addition to the switches 612. In at least one example, one or more of the control boards 610, 618 can present itself as a halo light edge light board. In some examples, the control boards 610, 618 can signal using near field communication (NFC) or other similar secure communication technology. Various examples of the active induction non-penetrating pushbutton 600 provide a number of technical improvements and advantages. In some examples the active induction non-penetrating pushbutton 600 may do one or more of the following: allow for a low-cost service replicable upper portion 602, provide support for backward compatibility with existing software, reduce or remove risk of liquid or debris entering the virtual button deck 650 by not including any penetration points through the display 402, reduce the risk of cracking of the display 402 by not including penetration points, allow for easy replacement of the upper portion 602, for example, using solvent to remove adhesive without the need to open the EGM., provide wireless halo lighting using the control boards 610, 618 as a halo light edge light board, allow for improved control of the button face 412, including moving, disabling, rattling, providing haptic feedback, controlling resistance against a press by the player 516, controlling threshold force required to press the button face 412, etc., allow for button count or placement to be adjusted without modifications to the virtual button deck 650 by repositioning the lower portion 604 to align with the desired location of the upper portion 602.

Figure 7A:
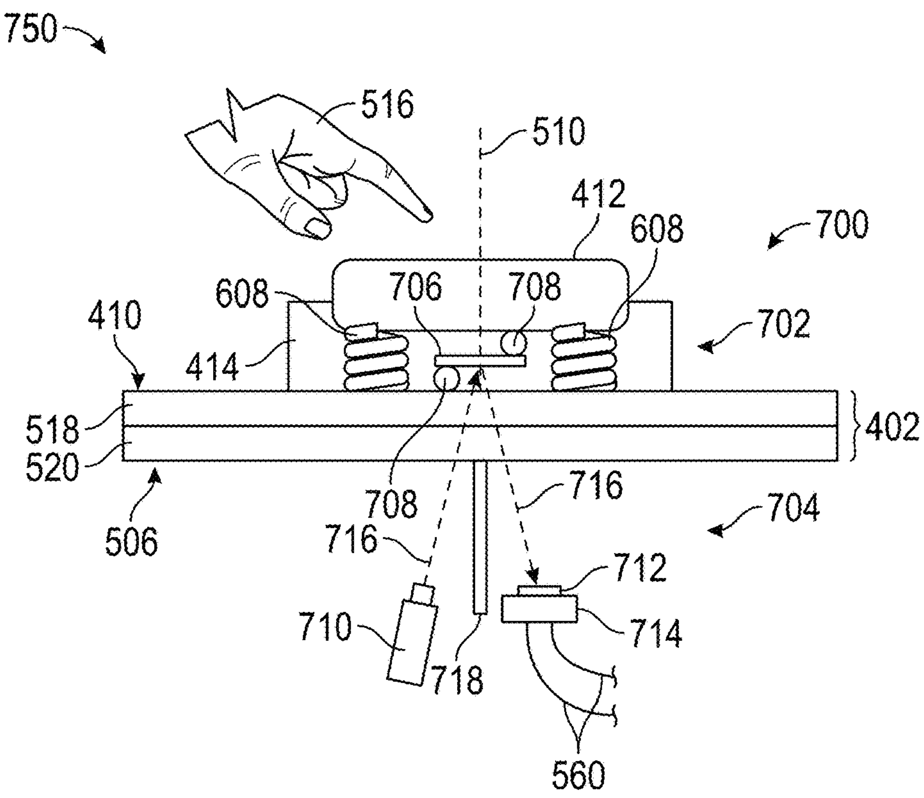
FIG. 7A is a partial cross-section view of an optical non-penetrating pushbutton assembly in an unpressed position, in accordance with at least one embodiment.
Figure 7B:
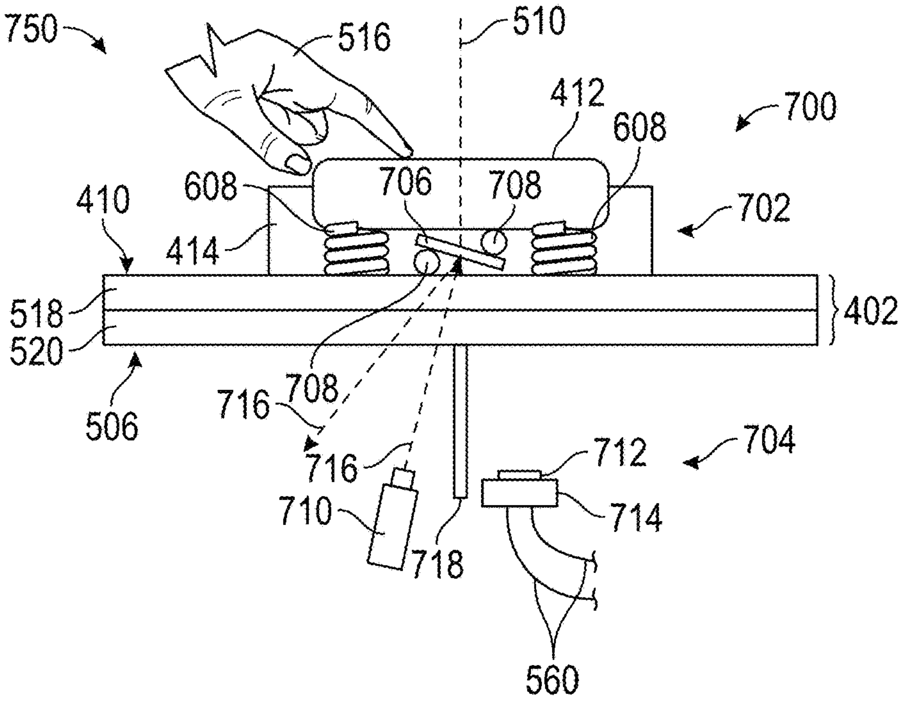
FIG. 7B is a partial cross-section view of an optical non-penetrating pushbutton assembly in a pressed position, in accordance with at least one embodiment.

FIG. 7A is a partial cross-section view of an optical non-penetrating pushbutton assembly 700 in an unpressed position and FIG. 7B is a partial cross-section view of the optical non-penetrating pushbutton assembly 700 in a pressed position. The optical non-penetrating pushbutton assembly 700 is a two-part non-penetrating pushbutton assembly that is part of a button deck 750 for an EGM and includes a display 402, an upper portion 702, and a lower portion 704. The upper portion 702 includes a button face 412 positioned in a button frame 414 as described with reference to FIGS. 4-5B, one or more biasing elements 608 as described with reference to FIG. 6, and a pivotable reflective surface 706. The pivotable reflective surface 706 is positioned between the button face 412 and the upper surface 410 of the display 402, such that when the player 516 presses the button face 412, the button face 412 causes the pivotable reflective surface 706 to pivot. Any of a variety of mechanisms may be used to allow or cause the pivotable reflective surface 706 to pivot as the button face 412 moves. The illustrated example includes the pivotable reflective surface 706 coupled to hinges 708, however other examples may use any combination of hinges, flexures, gimbals, or the like to allow a reflective surface 706 to pivot.

The lower portion 704 includes a light source 710, a light sensor 712, and a control board 714. The light source 710 directs a light beam 716 toward the reflective surface 706 and the reflective surface 706 reflects the light beam 716 at different angles as it pivots. In at least one example, the light source 710 is a laser. In the illustrated example, the reflective surface 706 reflects the light beam 716 toward the light sensor 712 when the button face 412 is in the unpressed position (FIG. 7A) and the reflective surface 706 reflects the light beam 716 away from the light sensor 712 when the button face 412 is in the pressed position (FIG. 7B). However, in other examples, the reflective surface 706 can reflect the light beam 716 away from the light sensor 712 in the unpressed position and toward the light sensor 712 in the pressed position. In at least one example, the lower portion 704 includes a divider or wall 718 to prevent the light sensor 712 from sensing light other than reflected from the reflective surface 706. Based on the readings from the light sensor 712, the control board 714 sends a signal to the EGM that the player 516 has pressed the button face 412. In some examples, the control board 714 of the lower portion 704 is coupled to one or more cables 560, for example, power cables, communication, cables, a combination of these, or the like. In at least one example, the lower portion 704 communicates with the EGM through cables 760. The upper portion 702 communicates wirelessly (i.e., by interacting with the light 716 from the light source 710) with the lower portion 704, such that any cables or wires or other physical connections connected to the EGM or the lower portion 704 are not directly coupled to the upper portion 702. That is, the upper portion 702 does not require any cables connecting it to the lower portion 704 or the EGM, and the upper portion 702 does not include or require an overlay to hide or protect such cables or to connect the upper portion 702 to the button deck 750. In some examples, the light source 710 can be diverted to light up the button face 412 or the button frame 414 in the unpressed or pressed position.

Figure 7C:
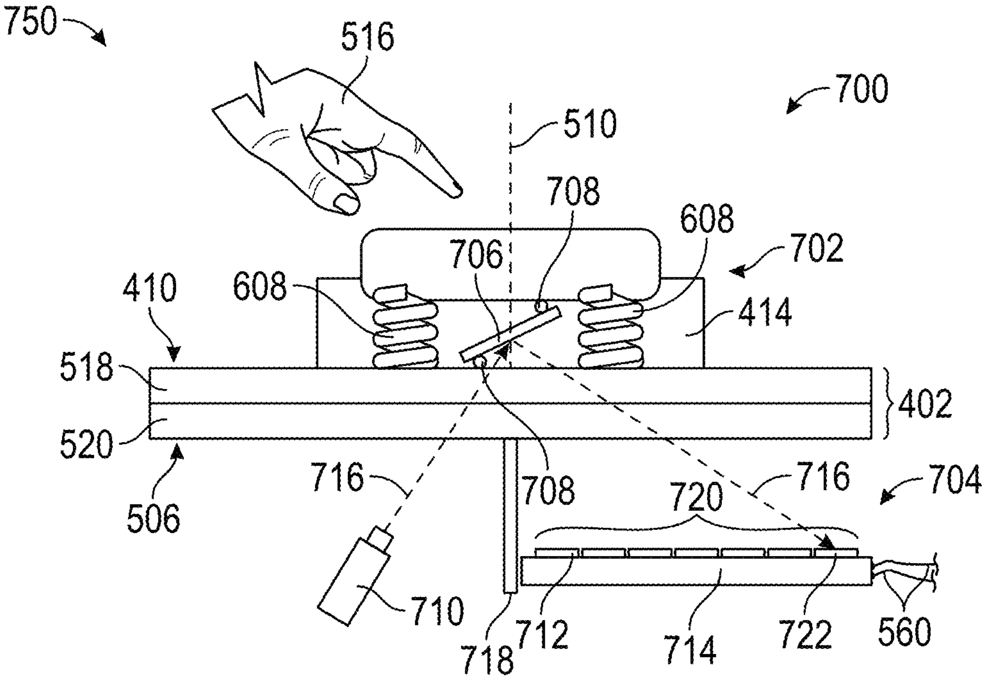
FIG. 7C is a partial cross-section view of another optical non-penetrating pushbutton assembly in an unpressed position, in accordance with at least one embodiment.
Figure 7D:
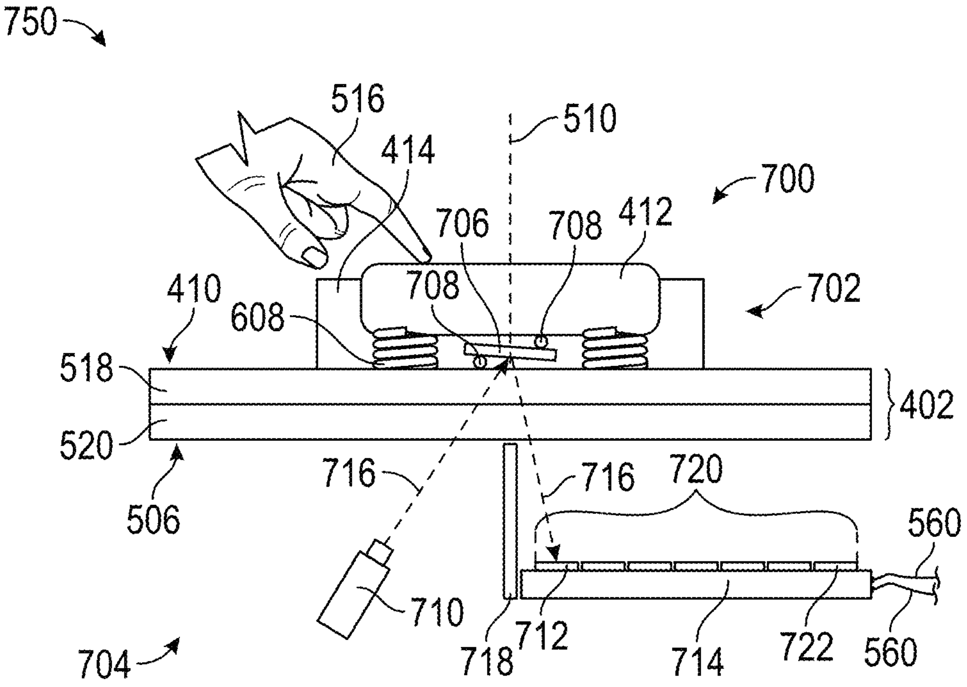
FIG. 7D is a partial cross-section view of another optical non-penetrating pushbutton assembly in a pressed position, in accordance with at least one embodiment.

FIGS. 7C and 7D are partial cross-section views of the optical non-penetrating pushbutton assembly 700 where the light sensor 712 is part of an array of light sensors 720, with FIG. 7C depicting the optical non-penetrating pushbutton assembly in the unpressed position, and FIG. 7D depicting the optical non-penetrating pushbutton assembly in the pressed position. The array of light sensors 720 allows the lower portion 704 to track the light beam 716 as the button face 412 moves. In the illustrated example, when the button face 412 is in the unpressed position (FIG. 7C), the light beam 716 reflects off of the reflective surface 706 to light sensor 722 of the array of light sensors 720. As the player 516 presses the button face 412, the reflective surface 706 will pivot, and the light sensor array 720 will sense the light beam 716 from one sensor to the next as it sweeps across the light sensor array 720. In the illustrated example, the light beam 716 traveled from light sensor 722 in the unpressed position (FIG. 7C) to light sensor 712 in the pressed position (FIG. 7D). The light sensor array 720 allows the optical non-penetrating pushbutton assembly 700 to determine additional data about the movement of the button face 412 when pressed by a player, for example velocity, acceleration, displacement, etc., which can be used to further enhance gameplay by providing different effects depending on how the player 516 presses the non-penetrating pushbutton assembly 700.

Figure 7E:
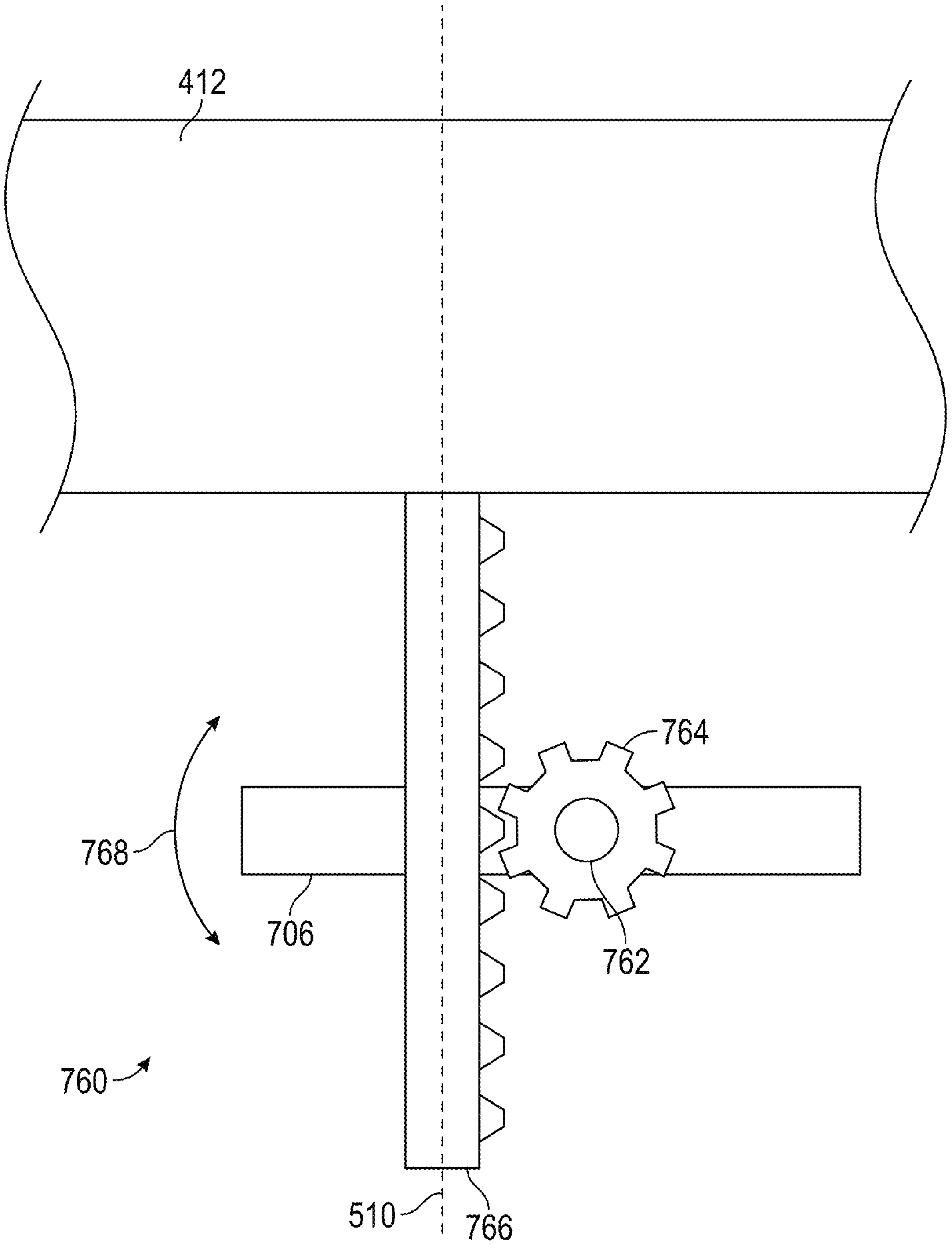
FIG. 7E is a partial cross-section view of a portion of an optical non-penetrating pushbutton assembly illustrating a pivotable reflective surface, in accordance with at least one embodiment.

FIG. 7E is a partial cross-section view of another pivoting mechanism 760 for allowing the reflective surface 706 to pivot 768 based on movement of the button face 412. In the illustrated example, the reflective surface 706 is mounted on an axle 762 coupled to a pinion gear 764, and a rack 766 is coupled to the button face 412, such that as the button face 412 is pressed, the rack 766 moves toward the upper surface 410 of the display 402. The rack 766 engages the pinion gear 764, such that as the rack moves toward the upper surface 410 of the display 402, the pinion gear 764 rotates causing the reflective surface 706 to pivot. The axle 762 can be coupled to a support that is coupled to the button frame 414.

While the pivotable reflective surface 706 is shown positioned near the middle of the button face 412 in FIGS. 7A-7E for illustrative purposes, in other example, the pivotable reflective surface 706 is positioned in a lobe or corner 416 of the non-penetrating pushbutton assembly 700, tucked in a perimeter of the button face 412, positioned under the button frame 414, or the like, such that images of the display 402 can be seen through the button face 412 without interference from the pivotable reflective surface 706, the light source 710, the light beam 716, or the control board 714. Further, while the illustrated example depicts a single light source 710 and a single pivotable reflective surface 706, other examples may include additional light sources 710 or pivotable reflective surfaces 706. The light sensor array 720 may include more or less light sensors than depicted in the illustrated example and may be arranged in any suitable way to detect movement of the light beam 716. In at least one example, the button frame 414 can include halo lighting as described with reference to FIGS. 4-6B.

Various examples of the optical non-penetrating pushbutton 700 provide a number of technical improvements and advantages. In some examples the optical non-penetrating pushbutton 700 may do one or more of the following: allow for a low-cost service replicable upper portion 702, provide support for backward compatibility with existing software, reduce or remove risk of liquid or debris entering the virtual button deck 750 by not including any penetration points through the display 402, reduce the risk of cracking of the display 402 by not including penetration points, allow for easy replacement of the upper portion 702, for example, using solvent to remove adhesive without the need to open the EGM., provide wireless halo lighting using the control board 714 as a halo light edge light board, allow for additional information related to button movement, including velocity, acceleration, or displacement of the button face 412, allow for button count or placement to be adjusted without modifications to the virtual button deck 750 by repositioning the lower portion 704 to align with the desired location of the upper portion 702.

Figure 8A:
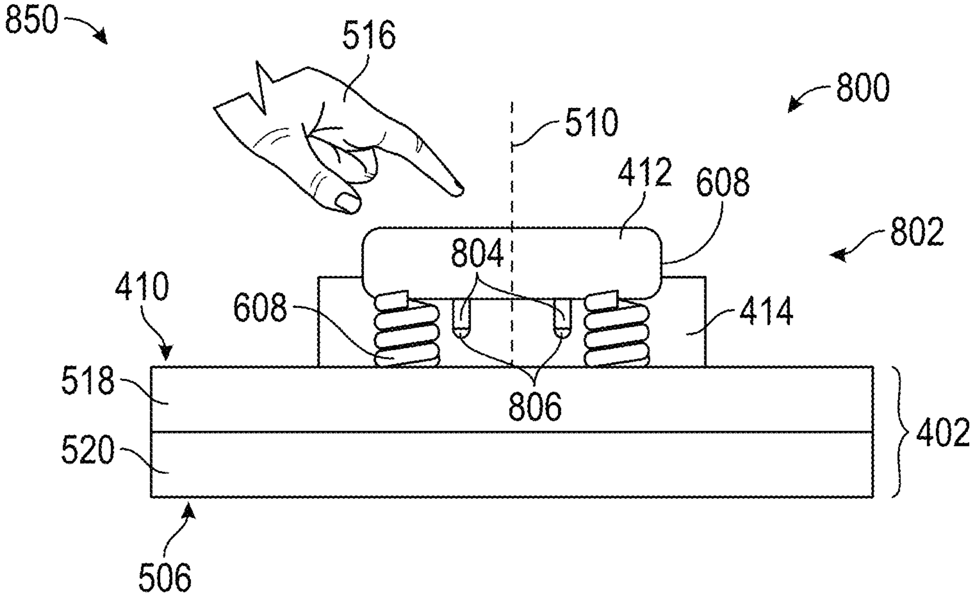
FIG. 8A is a partial cross-section view of a hidden touch non-penetrating pushbutton assembly in an unpressed position, in accordance with at least one embodiment.
Figure 8B:
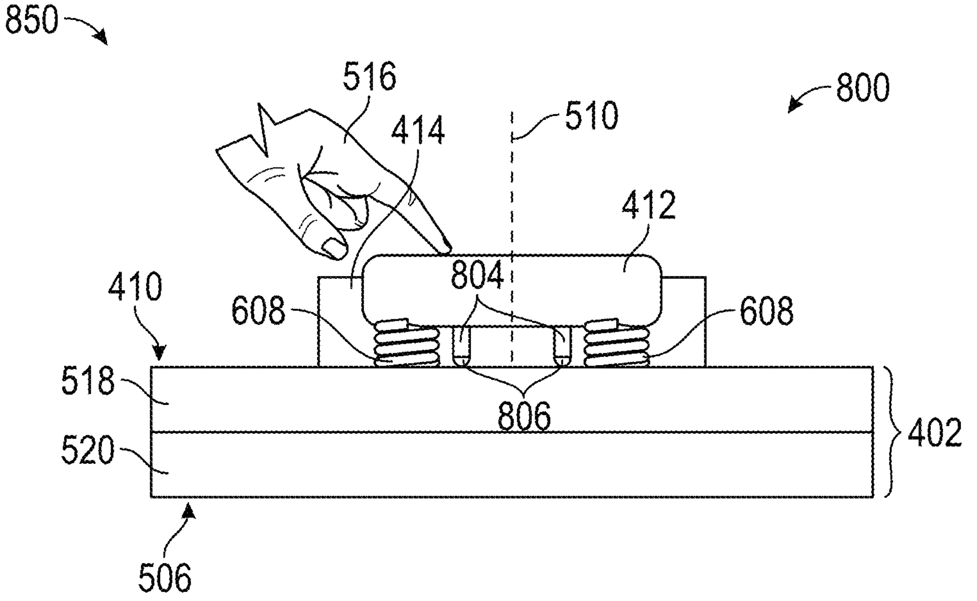
FIG. 8B is a partial cross-section view of a hidden touch non-penetrating pushbutton assembly in a pressed position, in accordance with at least one embodiment.

FIG. 8A is a partial cross-section view of a hidden touch non-penetrating pushbutton assembly 800 in an unpressed position and FIG. 8B is a partial cross-section view of the hidden touch non-penetrating pushbutton assembly 800 in a pressed position. The hidden touch non-penetrating pushbutton assembly 800 is part of a virtual button deck 850 for an EGM and includes a display 402 and an upper portion 802. Unlike the embodiments described with reference to FIGS. 5A-7D, the hidden touch non-penetrating pushbutton assembly 800 does not require a lower portion to communicate to the EGM that the player 516 has pressed the button face 412, and it still does not require any penetration points through the display 402. The upper portion 802 includes at least one biasing mechanism 608 as described with reference to FIG. 6, and at least one stylus 804 with a nib 806 configured to register a touch on a touchscreen. In some examples, the pushbutton assembly 800 includes at least three styluses 804 having nibs 806. The styluses 804 are coupled to the button face 412, such that as the player 516 presses the button face 412 toward the upper surface 410 of the display 402, the styluses 804 move toward the upper surface 412 of the display and the nibs 806 eventually touch the upper surface 410 of the display 402 to register a button push. The display 402 is configured as a touchscreen underneath the styluses 804, such that the display 402 recognizes the button press and signals the EGM that the player 516 has pressed the button face 412.

In various examples, the hidden touch non-penetrating pushbutton 800 may include any number of styluses 804 and nubs 806. In some examples, the styluses 804 are positioned around a perimeter of the button face 412 or in lobes or corners 416 of the pushbutton assembly 800, such that images of the display are visible through the button face 412 without interference from the styluses 804. The hidden touch non-penetrating pushbutton 800 allows the player 516 to press a physical pushbutton that signals the EGM that the pushbutton has been pressed, without requiring any penetration points through the display 402 of the virtual button deck 850. Various examples of the hidden touch non-penetrating pushbutton 800 provide a number of technical improvements and advantages. In some examples the hidden touch non-penetrating pushbutton 800 may do one or more of the following: allow for a low-cost service replicable upper portion 802, reduce or remove risk of liquid or debris entering the virtual button deck 850 by not including any penetration points through the display 402, reduce the risk of cracking of the display 402 by not including penetration points, allow for easy replacement of the upper portion 802, for example, using solvent to remove adhesive without the need to open the EGM., allow for an option without a lower portion, allow for placement anywhere on a touchscreen display 402, allow for multiple non-penetrating pushbuttons 800 to be used in close proximity, provide simulated halo lighting using the display 402 through button frame 414, provide a low-cost non-penetrating pushbutton 800.

In some examples, the non-penetrating pushbutton assembly 406, 500, 600, 700, 800 is interchangeable with pushbuttons of existing virtual button decks. Generally speaking, some examples may include more or less of any element of each of the non-penetrating pushbutton assembly 406, 500, 600, 700, 800, with the number and placement of each element depending on any of a variety of factors, such as, the shape of the button face, the shape of the button frame, the shape of any given element, the function of the pushbutton assembly 406, 500, 600, 700, 800, the virtual button deck, the EGM, or the software, etc. In some examples, the pushbutton assembly 406, 500, 600, 700, 800 represents a bash button.

Other non-limiting example configurations are described in the following individually numbered Examples.

Example 1 is a button deck for an electronic gaming machine (EGM), comprising: a substrate having an upper surface and a lower surface; a non-penetrating pushbutton assembly, including: an upper portion positioned on the upper surface of the substrate, the upper portion including: a button frame coupled to the upper surface of the substrate; a button face positioned in the button frame and configured to be pressed such that the button face moves within the button frame toward the upper surface of the substrate; and a plurality of magnets coupled to the button face; and a lower portion positioned at the lower surface of the substrate, the lower portion including: at least one electromagnet positioned such that it is aligned with one or more of the plurality of magnets, and a control board electrically coupled to the at least one electromagnet and configured to: drive the at least one electromagnet to create a magnetic field; identify a fluctuation in power required to drive the at least one electromagnet caused by a magnetic field of the plurality of magnets interacting with the magnetic field of the at least one electromagnet when the button face is pressed by a player; and send a signal to the EGM that the button face has been pressed.

In Example 2, the subject matter of Example 1 optionally includes wherein the upper portion of the non-penetrating pushbutton assembly is coupled to the upper surface of the substrate with adhesive.

In Example 3, the subject matter of any one or more of Examples 1-2 optionally include wherein the plurality of magnets comprises at least three static magnets.

In Example 4, the subject matter of Example 3 optionally includes wherein the upper portion: does not include an overlay with a cutout for the upper portion; and does not include a cable connecting the upper portion to the lower portion or the EGM.

In Example 5, the subject matter of any one or more of Examples 1-4 optionally include wherein the control board is configured to change the force required to press the button face by controlling the intensity of the electromagnet.

In Example 6, the subject matter of any one or more of Examples 1-5 optionally include wherein the control board is configured to disable the pushbutton by controlling the electromagnet to reverse the magnetic field to pull the button into a pressed position.

In Example 7, the subject matter of any one or more of Examples 1-6 optionally include wherein the control board is configured to control the intensity and direction of the electromagnet to provide haptic feedback via the button face and to rattle the button face within the button frame.

In Example 8, the subject matter of any one or more of Examples 1-7 optionally include wherein the substrate is a display and the button face comprises a transparent material such that the display is visible through the button face.

In Example 9, the subject matter of any one or more of Examples 1-8 optionally include wherein the substrate is a display and the button frame comprises a light diffusing material such that diffused light from the display is visible through the button frame.

Example 10 is an input interface assembly for an electronic gaming machine (EGM), comprising: a substrate defining an upper surface and a lower surface; a non-penetrating pushbutton assembly, including: an upper button assembly positioned on the upper surface of the substrate, the upper button assembly including: a button frame coupled to the upper surface of the substrate; a button face positioned in the button frame and configured to be pressed such that the button face moves within the button frame toward the upper surface of the substrate; an upper induction coil positioned in the button frame; a biasing mechanism configured to bias the button face away from the upper surface of the substrate; an upper control board electrically coupled to the upper induction coil; and at least one switch positioned in the button frame such that the at least one switch is closed when the button face is pressed; and a lower button assembly positioned at the lower surface of the substrate, the lower button assembly including: a lower induction coil positioned to power the upper induction coil, and a lower control board electrically coupled to the lower induction coil; wherein the lower induction coil is configured to power the upper induction coil such that the upper induction coil powers the upper control board; wherein the upper control board is configured to signal the lower button assembly when the at least one switch is closed and in response the lower control board is configured to signal the EGM that the button face has been pressed.

In Example 11, the subject matter of Example 10 optionally includes wherein the upper induction coil is imbedded in the button frame.

In Example 12, the subject matter of any one or more of Examples 10-11 optionally include wherein the at least one switch is selected from the group consisting of: a photogate, a magnetic field effect sensor, and a mechanical switch.

In Example 13, the subject matter of any one or more of Examples 10-12 optionally include wherein the upper button assembly further comprises one or more lights, such that the lower induction coil is configured to power the one or more lights via the upper conduction coil.

In Example 14, the subject matter of any one or more of Examples 10-13 optionally include wherein the biasing mechanism comprises: one or more magnets or electromagnets such that the button face is biased via magnetic suspension.

Example 15 is a button deck for an electronic gaming machine (EGM), comprising: a substrate; a non-penetrating pushbutton assembly, including: an upper portion positioned on an upper surface of the substrate, the upper portion including: a button frame coupled to the upper surface of the substrate; a button face positioned in the button frame and configured to be pressed such that the button face moves within the button frame toward the upper surface of the substrate from an unpressed position to a pressed position;

a pivotable reflective surface positioned between the button face and the substrate, wherein the pivotable reflective surface is configured to pivot based on movement of the button face; and a biasing mechanism configured to bias the button face away from the upper surface of the substrate; and a lower portion positioned at a lower surface of the substrate, the lower portion including: a light source configured to direct a light beam toward the reflective surface, and a light sensor configured to detect the light beam reflected from the reflective surface; wherein the pushbutton assembly is configured such that the position of the button face determines whether the light sensor detects the light beam reflected from the reflective surface; wherein the light sensor is configured to signal the EGM when the button face has been pressed.

In Example 16, the subject matter of Example 15 optionally includes wherein the pushbutton assembly is configured such that: when the button face is in the unpressed position, the light sensor detects the light beam reflected from the reflective surface; and when the button face is pressed into the pressed position the pivotable reflective surface pivots such that the light sensor does not detect the light beam reflected from the reflective surface.

In Example 17, the subject matter of any one or more of Examples 15-16 optionally include wherein the pushbutton assembly is configured such that: when the button face is in the unpressed position, the light sensor does not detect the light beam reflected from the reflective surface; and when the button face is pressed into the pressed position the pivotable reflective surface pivots such that the light sensor detects the light beam reflected from the reflective surface.

In Example 18, the subject matter of any one or more of Examples 15-17 optionally include a light sensor array comprising the light sensor, wherein the light sensor array is configured to track movement of the light beam as the button face moves.

In Example 19, the subject matter of any one or more of Examples 15-18 optionally include wherein: the reflective surface is mounted on an axle coupled to a pinion gear; a rack is coupled to the button face such that as the button is pressed the rack moves toward the upper surface of the substrate; and the rack is configured to engage the pinion gear, such that as the rack moves the pinion gear rotates causing the reflective surface to pivot.

In Example 20, the subject matter of any one or more of Examples 15-19 optionally include wherein the pushbutton assembly is configured such that the light beam from the light source lights up the button face in one or more positions of the button face.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A button deck for an electronic gaming machine (EGM), comprising:

a substrate;

a non-penetrating pushbutton assembly, including:

an upper portion positioned on an upper surface of the substrate, the upper portion including:

a button frame coupled to the upper surface of the substrate;

a button face positioned in the button frame and configured to be pressed such that the button face moves within the button frame toward the upper surface of the substrate from an unpressed position to a pressed position;

a pivotable reflective surface positioned between the button face and the substrate, wherein the pivotable reflective surface is configured to pivot based on movement of the button face; and a biasing mechanism configured to bias the button face away from the upper surface of the substrate; and a lower portion positioned at a lower surface of the substrate, the lower portion including:

a light source configured to direct a light beam toward the pivotable reflective surface; and a light sensor configured to detect the light beam reflected from the pivotable reflective surface;

wherein the non-penetrating pushbutton assembly is configured such that a position of the button face determines whether the light sensor detects the light beam reflected from the pivotable reflective surface; and wherein the light sensor is configured to signal the EGM when the button face has been pressed.

2. The button deck of claim 1, wherein the non-penetrating pushbutton assembly is configured such that:

when the button face is in the unpressed position, the light sensor detects the light beam reflected from the pivotable reflective surface; and when the button face is pressed into the pressed position the pivotable reflective surface pivots such that the light sensor does not detect the light beam reflected from the pivotable reflective surface.

3. The button deck of claim 1, wherein the non-penetrating pushbutton assembly is configured such that:

when the button face is in the unpressed position, the light sensor does not detect the light beam reflected from the pivotable reflective surface; and when the button face is pressed into the pressed position the pivotable reflective surface pivots such that the light sensor detects the light beam reflected from the pivotable reflective surface.

4. The button deck of claim 1, further comprising:

a light sensor array comprising the light sensor, wherein the light sensor array is configured to track movement of the light beam as the button face moves.

5. The button deck of claim 1, wherein:

the pivotable reflective surface is mounted on an axle coupled to a pinion gear;

a rack is coupled to the button face such that as the button face is pressed the rack moves toward the upper surface of the substrate; and the rack is configured to engage the pinion gear, such that as the rack moves the pinion gear rotates causing the pivotable reflective surface to pivot.

6. The button deck of claim 1, wherein the non-penetrating pushbutton assembly is configured such that the light beam from the light source lights up the button face in one or more positions of the button face.

7. The button deck of claim 1, wherein the substrate comprises a display.

8. The button deck of claim 1, wherein the pivotable reflective surface is configured to pivot using one or more hinges, flexures, or gimbals.

9. The button deck of claim 1, wherein the lower portion includes a divider or wall to prevent the light sensor from sensing light other than the light beam reflected from the pivotable reflective surface.

10. The button deck of claim 1, wherein the lower portion includes a lower control board that is coupled to one or more cables.

11. The button deck of claim 10, wherein the one or more cables comprise at least one of power cables or communication cables.

12. The button deck of claim 10, wherein the lower portion communicates with the EGM through the one or more cables.

13. An electronic gaming machine (EGM), comprising:

a game controller; and a button deck, communicably coupled to the game controller, comprising:

a substrate;

a non-penetrating pushbutton assembly, including:

an upper portion positioned on an upper surface of the substrate, the upper portion including:

a button frame coupled to the upper surface of the substrate;

a button face positioned in the button frame and configured to be pressed such that the button face moves within the button frame toward the upper surface of the substrate from an unpressed position to a pressed position;

a pivotable reflective surface positioned between the button face and the substrate, wherein the pivotable reflective surface is configured to pivot based on movement of the button face; and a biasing mechanism configured to bias the button face away from the upper surface of the substrate; and a lower portion positioned at a lower surface of the substrate, the lower portion including:

a light source configured to direct a light beam toward the pivotable reflective surface; and a light sensor configured to detect the light beam reflected from the pivotable reflective surface;

wherein the non-penetrating pushbutton assembly is configured such that a position of the button face determines whether the light sensor detects the light beam reflected from the pivotable reflective surface; and wherein the light sensor is configured to signal the game controller when the button face has been pressed.

14. The EGM of claim 13, wherein the upper portion communicates wirelessly with the lower portion.

15. The EGM of claim 13, wherein the upper portion communicates wirelessly with the lower portion by interacting with the light beam from the light source.

16. The EGM of claim 13, wherein the light source is operable to be diverted to light up at least one of the button face or the button frame.

17. A button deck for an electronic gaming machine (EGM), comprising:

a substrate;

a non-penetrating pushbutton assembly, including:

a first portion positioned on a first surface of the substrate, the first portion including:

a button frame coupled to the first surface of the substrate;

a button face positioned in the button frame and configured to be pressed such that the button face moves within the button frame toward the first surface of the substrate from an unpressed position to a pressed position;

a pivotable reflective surface positioned between the button face and the substrate, wherein the pivotable reflective surface is configured to pivot based on movement of the button face; and a biasing mechanism configured to bias the button face away from the first surface of the substrate; and a second portion positioned at a second surface of the substrate, the second portion including:

a light source configured to direct a light beam toward the pivotable_reflective surface; and a light sensor configured to detect the light beam reflected from the pivotable reflective surface;

wherein the non-penetrating pushbutton assembly is configured such that the position of the button face determines whether the light sensor detects the light beam reflected from the pivotable reflective surface; and wherein the light sensor is configured to signal the EGM when the button face has been pressed.

18. The button deck of claim 17, wherein:

the light sensor is part of a light sensor array; and the light beam sweeps along the light sensor array as the button face moves within the button frame.

19. The button deck of claim 17, wherein the non-penetrating pushbutton assembly is operable to determine at least one of a velocity of the button face, an acceleration of the button face, or a displacement of the button face.

20. The button deck of claim 17, wherein the pivotable reflective surface is positioned adjacent to a middle of the button face.

* * * * *